(12) United States Patent
Troschitz et al.

(10) Patent No.: US 6,758,245 B2
(45) Date of Patent: Jul. 6, 2004

(54) COMPOSITE PIPE HAVING A PTFE INNER LAYER AND A COVERING LAYER OF A FIBER-REINFORCED PLASTICS MATERIAL

(75) Inventors: Ralf Troschitz, Vallendar (DE); Willibald Schmidt, Berod (DE); Heribert Weisenfeld, Berod (DE)

(73) Assignee: SGL Carbon AG, Meitingen (DE)

(*) Notice: Subject to any disclaimer, the term of this patent is extended or adjusted under 35 U.S.C. 154(b) by 0 days.

(21) Appl. No.: 10/350,194

(22) Filed: Jan. 23, 2003

(65) Prior Publication Data

US 2003/0140978 A1 Jul. 31, 2003

(30) Foreign Application Priority Data

Jan. 25, 2002 (DE) .................................. 102 03 123

(51) Int. Cl.[7] ............................................. F16L 11/00
(52) U.S. Cl. ................ 138/125; 138/137; 138/141; 138/DIG. 3; 428/36.91; 428/36.2
(58) Field of Search ............................ 138/125, 141, 138/137, 153, DIG. 3; 428/36.91, 36.2

(56) References Cited

U.S. PATENT DOCUMENTS

| | | | | |
|---|---|---|---|---|
| 3,718,161 A | * | 2/1973 | Woodson ..................... | 138/153 |
| 3,866,631 A | * | 2/1975 | Chudgar ...................... | 138/125 |
| 4,104,095 A | * | 8/1978 | Shaw ............................ | 138/132 |
| 4,347,090 A | * | 8/1982 | Anderson et al. ............ | 138/125 |
| 4,357,962 A | * | 11/1982 | Shaw, Deceased et al. . | 138/125 |
| 4,560,607 A | * | 12/1985 | Sumner ....................... | 428/141 |
| 4,617,213 A | * | 10/1986 | Asano et al. ................ | 138/141 |
| 4,686,126 A | * | 8/1987 | Hyodo et al. ................. | 138/97 |
| 4,877,665 A | * | 10/1989 | Higuchi et al. .............. | 138/124 |
| 4,942,906 A | * | 7/1990 | Igarashi et al. .............. | 138/126 |
| 5,170,011 A | * | 12/1992 | Martucci ..................... | 138/137 |
| 5,264,276 A | * | 11/1993 | McGregor et al. .......... | 428/252 |
| 5,488,975 A | * | 2/1996 | Chiles et al. ................ | 138/125 |
| 5,613,524 A | * | 3/1997 | Martucci ..................... | 138/137 |
| RE35,527 E | * | 6/1997 | Martucci ..................... | 138/118 |
| 5,671,778 A | * | 9/1997 | Sakuragi et al. ............. | 138/97 |
| 6,089,277 A | * | 7/2000 | Kodama et al. ............. | 138/126 |
| 2003/0124290 A1 | * | 7/2003 | Linker ...................... | 428/36.91 |

FOREIGN PATENT DOCUMENTS

| | | |
|---|---|---|
| DE | 198 41 121 A1 | 3/2000 |
| JP | 02 035 287 A | 2/1990 |

* cited by examiner

*Primary Examiner*—James Hook
(74) *Attorney, Agent, or Firm*—Laurence A. Greenberg; Werner H. Stemer; Ralph E. Locher

(57) ABSTRACT

A composite pipe includes a polytetrafluoroethylene (PTFE) inner layer and a covering layer of fiber-reinforced plastics material which are joined to one another by force-locking and form-locking through an intermediate layer. The intermediate layer is formed of a PFA layer and a layer of glass or carbon fibers, in order to improve adhesive and shear strength between the PTFE inner layer and the covering layer. The PFA layer is adjacent the PTFE inner layer and the layer of glass or carbon fibers is adjacent the covering layer of fiber-reinforced plastics material.

6 Claims, 1 Drawing Sheet

COMPOSITE PIPE HAVING A PTFE INNER LAYER AND A COVERING LAYER OF A FIBER-REINFORCED PLASTICS MATERIAL

BACKGROUND OF THE INVENTION

FIELD OF THE INVENTION

The invention relates to a composite pipe having a polytetrafluoroethylene (PTFE) inner layer and a covering layer of fiber-reinforced plastics material, which are joined to one another by force-locking and form-locking through an intermediate layer. A force-locking connection is one which connects two elements together by force external to the elements, as opposed to a form-locking connection which is provided by the shapes of the elements themselves.

In the chemical industry in particular, composite pipes which include an inner layer and a covering layer are used for transportation of liquids and gases.

A thermoplastic plastics pipe is used in that case as the inner layer. The plastics material is chosen on the basis of the properties of the medium for transportation. Plastics pipes made of polypropylene (PP), polyvinyl chloride (PVC) and polyvinylidene fluoride (PVDF) are currently those chiefly employed. Due to the increasing requirements of safety and performance, higher resistance to heat and to media is required of the thermoplastic materials being employed. Those increasing requirements are met by completely fluorinated plastics, such as perfluoroethylenepropylene (FEP), perfluoroalkoxytetrafluoroethylene (PFA) or also polytetrafluoroethylene (PTFE). PTFE has a particular role in that case due to its favorable price.

The wall thickness of an inner layer formed from such a plastics pipe is about 2 to 8 mm. Such a plastics pipe can only accommodate a slightly increased pressure, especially at higher temperatures. It is therefore necessary to provide the thermoplastic plastics pipes with a supporting covering layer which includes a thermosetting plastics material reinforced with glass or carbon fibers.

That supporting covering layer of reinforced thermosetting plastics material only undergoes intimate bonding with the thermoplastic inner layer upon an additional outlay. Various intermediate layers are used in order to nevertheless achieve adequate adhesive and shear strengths between the inner and covering layers. According to DIN (*German Standards Institution*) 16 964, the following adhesive shear strengths in segment shear tests (method B) are required for composite pipes with a thermoplastic inner layer:

| Material of the inner layer | Adhesive shear strength [N/mm$^2$] |
| --- | --- |
| PVC | 7 |
| PE-HD | 2.5 |
| PP | 3.5 |
| PVDF | 5 |

Pipes of various thermoplastic plastics, for example PVC, polyamide, acrylic resins, polycarbonates, etc. are mentioned as an inner layer in Patent Abstracts of Japan, Publication No. 02035287 A. Those thermoplastic plastics pipes are adhesively joined to the thermosetting covering layer of the composite pipe, e.g. with the aid of isophthalic acid resins. The isophthalic acid resins include compounds which contain an isocyanate group. The disadvantage of that process is that PTFE in general cannot be adhesively joined.

If the pipes of the inner layer are made of polyolefins, in the normal case a glass fiber woven fabric is chosen as the intermediate layer. That glass fiber woven fabric is anchored mechanically to the surface of the inner layer. In practice, the anchoring is achieved by melting the surface of the polyolefin pipes which form the inner layer and partly embedding in that molten surface a continuous glass woven tape under tension and spirally with respect to the longitudinal axis of the pipe. The part of the fiber woven fabric projecting out of the surface of the inner layer is then wetted with the reactive resin required for the supporting covering layer. Thereafter, the covering layer is produced from the glass fibers impregnated with plastics material. In the following step the covering layer completely cures together with the intermediate layer. That structure is described in Works Standard 1250, part 2 of the firm Bayer AG. German Published, Non-Prosecuted Patent Application DE 198 41 121 A1 describes an intermediate layer which includes thermoplastic plastics fibers in addition to the glass fibers. Woven fabric produced from the two types of fiber is introduced into the intermediate layer. The plastics material of the thermoplastic plastics fibers is chosen in such a way that it can be welded with the plastics material of the inner layer of the composite pipe. As a result thereof, for example if polypropylene inner layers are employed, composite pipes with twice the adhesive shear strengths of composite pipes with an intermediate layer which includes only glass fiber woven tape, can be produced. However, the resistance of those inner layer materials to heat and media is not sufficient in many types of use in the chemical industry.

In the case of partly fluorinated plastics material, such as PVDF, inner layers with an activated surface ("etched pipes") are conventionally employed in order to achieve an adhesive action with the covering layer. The melting of glass woven tape into the surface of the PVDF inner layer is expensive and is therefore avoided in the normal case.

Due to the high heat resistance of completely fluorinated polymers, in the case of that class of plastics it is even far more expensive to apply a glass woven tape. Inner pipes of comparatively inexpensive PTFE represent a particular problem in that case, since the melt viscosity required for the embedding is very high for that type of material. The individual crystallites in the PTFE indeed melt above a certain temperature, but in macromechanical terms no liquefaction takes place, and rather the PTFE decomposes as the temperature is increased further. If embedding of the fibers is successful in spite of the low melt viscosity, only low shear strengths between the PTFE body and fiber product are achieved. Thus, with specimens produced in that manner it has been possible to measure shear strengths of only about 1 N/mm$^2$, which are therefore far below the strengths required according to DIN 16 964. Chemical treatment of the surface in the case of PTFE pipes is also not possible in the normal case for reasons of environmental incompatibility, and furthermore it has not been possible to achieve higher strengths with that process. Adhesive joining of the inner layer and covering layer likewise is not possible because of the antiadhesive behavior of the materials.

SUMMARY OF THE INVENTION

It is accordingly an object of the invention to provide a composite pipe having a PTFE inner layer and a covering layer of a fiber-reinforced plastics material, which overcomes the hereinafore-mentioned disadvantages of the heretofore-known products of this general type and in which adhesive and shear strength between the inner layer of PTFE and the covering layer of fiber-reinforced plastics material is improved considerably.

With the foregoing and other objects in view there is provided, in accordance with the invention, a composite pipe, comprising a PTFE inner layer, a covering layer of fiber-reinforced plastics material, and an intermediate layer force-lockingly and form-lockingly joining the inner layer and the covering layer to one another. The intermediate layer has two sides, a surface of PFA on one of the sides and a glass or carbon fiber textile product on the other of the sides.

Therefore, the object of the invention is achieved by providing a composite pipe which employs a special intermediate layer between the inner layer and the covering layer, instead of a surface treatment of the PTFE inner layer or instead of an adhesive joining or instead of an embedding of a glass fiber woven fabric on the surface of the inner layer. This intermediate layer includes PFA on the side facing the inner layer and textile glass or carbon fiber products, preferably of woven fabric, on the side facing the covering layer.

The PFA of the intermediate layer can be welded particularly well with the outer surface of the PTFE inner layer. This is because of the similar chemical make-up of the two fluorine-containing plastics materials and temperature ranges for the melting or sintering which lie close to one another or overlap. Since the joining of the PTFE inner layer and the hybrid intermediate layer takes place under application of pressure, the occurrence of delaminations in the entire composite of the inner layer and the intermediate layer is reliably prevented. As a result, adhesive and shear strengths which are considerably above the strengths required according to DIN 16 964 (5 N/mm$^2$ in the case of PVDF) are achieved. Other advantages of the composite pipe of a PTFE inner layer, an intermediate layer and a covering layer of fiber-reinforced plastics material according to the invention are the following: Pipeline systems can be constructed without flange connections. This has the advantage of omitting flanges which are critical with respect to leakages. Costs and weight are furthermore saved.

Other features which are considered as characteristic for the invention are set forth in the appended claims.

Although the invention is illustrated and described herein as embodied in a composite pipe having a PTFE inner layer and a covering layer of a fiber-reinforced plastics material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
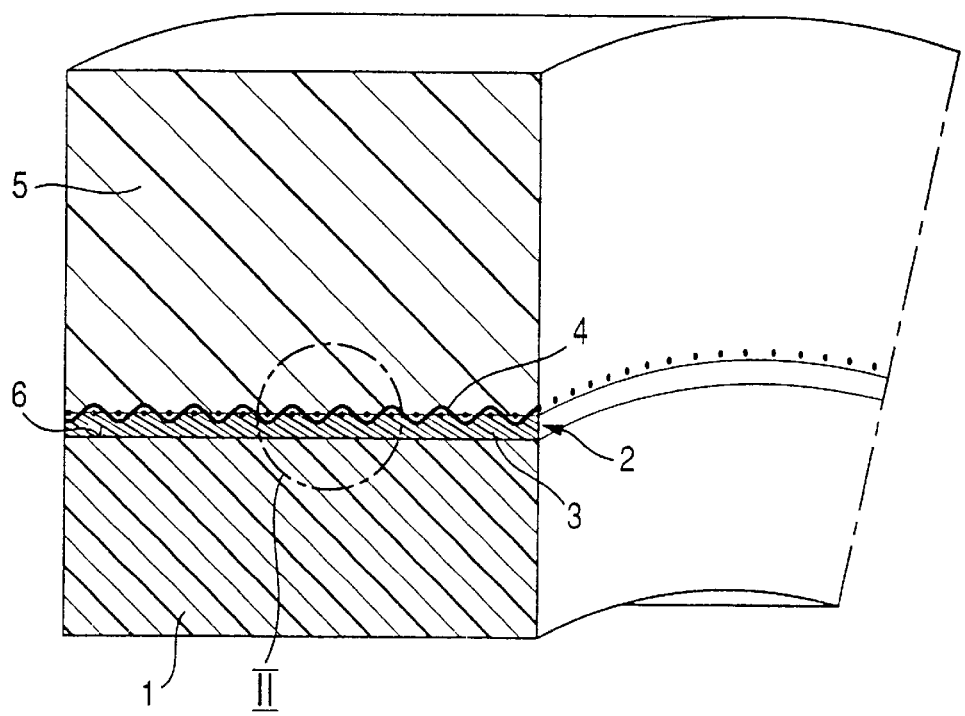
FIG. 1 is a diagrammatic, partly-sectional, perspective view of a composite pipe according to the invention.
Figure 2:
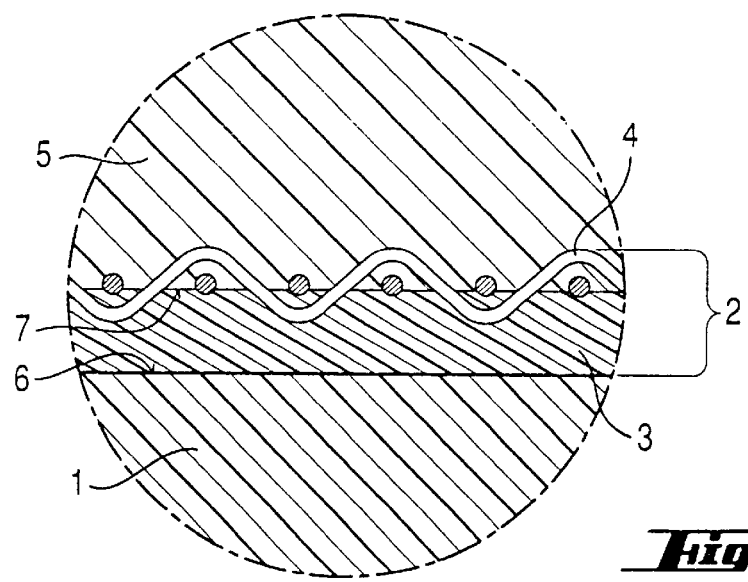
FIG. 2 is an enlarged view of a portion II of FIG. 1.

Referring now to the figures of the drawings in detail and first, particularly, to FIG. 1 thereof, there is seen a partly-sectional view of a wall 1 of a pipe of PTFE, optionally adjusted antistatically by including a conductive pigment 8, which forms an inner layer of a composite pipe. An outer surface 6 of the PTFE plastics pipe 1 is heated through the use of hot air until this surface 6 becomes soft. An intermediate layer 2, which is also heated, is then spirally wound with low tension onto the surface 6 along a pipe axis under an additional pressure loading. The intermediate layer 2 has a thickness of 0.5 to 3 mm, noting that a thickness of 1 to 2 mm is advantageous for processing reasons. The intermediate layer 2 is formed of a layer of PFA on a side 3 facing the PTFE inner layer 1 and is welded with the surface 6 of the PTFE pipe during winding. The intermediate layer 2 is thereby bonded firmly to the outer surface 6 of the inner layer 1. A covering layer 5 of fiber-reinforced plastics material is then produced in a known manner on the intermediate layer 2 which has been anchored with the inner layer 1 as described. Adhesion between the intermediate layer 2 and the covering layer 5 results from a textile product, preferably a woven fabric 4, of fibers of carbon or glass, projecting out of a surface 7 of the intermediate layer 2, as best seen in FIG. 2.

In composite pipes with a PTFE inner layer which have been produced in this manner, it has been possible to measure shear strengths between the covering layer and the inner layer. Those shear strengths are about 10 (ten) times higher than in conventional composite pipes with a PTFE inner layer and a chemically pretreated outer surface, adhesive joining or "welded-in glass woven tape".

In detail, 9.7 N/mm$^2$ was measured as the mean for the adhesive shear strength according to DIN 53 769-B at a standard deviation of 1.2 N/mm$^2$, for the composite pipes according to the invention. Even upon exposure to alternating temperature tests from 20 to 200° C., no reduction in shear strengths was found when highly heat-resistant resins were used in the covering layer.

We claim:

1. A composite pipe, comprising:

a PTFE inner layer;

a covering layer of fiber-reinforced plastics material; and a heterogeneous hybrid intermediate layer force-lockingly and form-lockingly joining said inner layer and said covering layer to one another, said intermediate layer having two sides, a surface of PFA welded on an inner side facing said PTFE inner layer and a glass or carbon fiber textile product having fibers protruding therefrom into said covering layer and bonded by said fibers to said covering layer.

2. The composite pipe according to claim 1, wherein said textile product of said intermediate layer is a woven fabric.

3. The composite pipe according to claim 1, wherein said inner layer is formed of antistatically adjusted PTFE material.

4. The composite pipe according to claim 1, wherein said inner layer includes antistatically adjusted covering layers.

5. The composite pipe according to claim 1, where said inner layer and said covering layer have an adhesive shear strength therebetween being on average at least as great as 9 N/mm$^2$, according to DIN 53 769-B.

6. A composite pipe, comprising:

an inner layer having antistatically adjusted cover layers;

a covering layer of fiber-reinforced plastics material; and a heterogeneous hybrid intermediate layer force-lockingly and form-lockingly joining said inner layer and said covering layer to one another, said intermediate layer having two sides, a surface of PFA welded on an inner side facing said PTFE inner layer and a glass or carbon fiber textile product having fibers protruding therefrom into said covering layer and bonded by said fibers to said covering layer.

* * * * *

UNITED STATES PATENT AND TRADEMARK OFFICE
CERTIFICATE OF CORRECTION

PATENT NO. : 6,758,245 B2
DATED : July 6, 2004
INVENTOR(S) : Ralf Troschitz et al.

It is certified that error appears in the above-identified patent and that said Letters Patent is hereby corrected as shown below:

<u>Title page,</u>
Item [73], Assignee, should read as follows:
-- [73] Assignee: SGL ACOTEC GmbH, Siershahn (DE) --

Signed and Sealed this

Seventh Day of September, 2004

JON W. DUDAS
*Director of the United States Patent and Trademark Office*